United States Patent
Delette et al.

(10) Patent No.: US 11,114,926 B2
(45) Date of Patent: Sep. 7, 2021

(54) ELECTROMAGNETIC ENERGY CONVERTER

(71) Applicant: COMMISSARIAT A L'ENERGIE ATOMIQUE ET AUX ENERGIES ALTERNATIVES, Paris (FR)

(72) Inventors: Gerard Delette, Grenoble (FR); Olivier Tosoni, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 349 days.

(21) Appl. No.: 16/337,484

(22) PCT Filed: Jun. 28, 2018

(86) PCT No.: PCT/FR2018/051589
§ 371 (c)(1),
(2) Date: Mar. 28, 2019

(87) PCT Pub. No.: WO2019/002775
PCT Pub. Date: Jan. 3, 2019

(65) Prior Publication Data
US 2019/0348896 A1  Nov. 14, 2019

(30) Foreign Application Priority Data

Jun. 30, 2017 (FR) .................................. 17 56233

(51) Int. Cl.
*H02K 21/14* (2006.01)
*H02K 21/02* (2006.01)
(Continued)

(52) U.S. Cl.
CPC ........... *H02K 21/14* (2013.01); *H02K 21/028* (2013.01); *H01H 50/18* (2013.01); *H01H 50/36* (2013.01); *H01H 50/44* (2013.01)

(58) Field of Classification Search
CPC ........ H02K 17/30; H02K 19/36; H02K 19/38; H02K 21/028–029; H02K 21/12–24; H02K 35/02
See application file for complete search history.

(56) References Cited

U.S. PATENT DOCUMENTS 9,240,267 B2    1/2016  Nagahara et al.
9,509,304 B2   11/2016  Ruff
(Continued)

FOREIGN PATENT DOCUMENTS

EP    2 445 092 A1    4/2012
FR    2 928 501 A1    9/2009
(Continued)

OTHER PUBLICATIONS

International Search Report dated Nov. 19, 2018 in PCT/FR2018/051589 filed on Jun. 28, 2018.
(Continued)

*Primary Examiner* — Quyen P Leung
*Assistant Examiner* — Minki Chang
(74) *Attorney, Agent, or Firm* — Oblon, McClelland, Maier & Neustadt, L.L.P.

(57) ABSTRACT

An electromagnetic energy converter includes: a conducting coil; a main magnet in an inner space V formed by the conducting coil, retaining structure allowing the main magnet to rotate about an axis YY' between two stable equilibrium positions; a first actuator magnet and a second actuator magnet disposed facing the first end and the second end respectively, the first and second actuator magnets being arranged to slide simultaneously in the same direction and parallel to the main axis XX' once a force is exerted on either one of the first or second magnets.

19 Claims, 3 Drawing Sheets

(51) Int. Cl.
    *H01H 50/18*           (2006.01)
    *H01H 50/36*           (2006.01)
    *H01H 50/44*           (2006.01)

(56)                   References Cited

U.S. PATENT DOCUMENTS

| | | |
|---|---|---|
| 2006/0001323 A1 | 1/2006 | Gang |
| 2008/0048506 A1 | 2/2008 | Deak |
| 2010/0323644 A1 | 12/2010 | Bataille et al. |
| 2012/0104765 A1 | 5/2012 | Esteve Tinto et al. |
| 2016/0197533 A1 | 7/2016 | Dolman |
| 2016/0365759 A1* | 12/2016 | Lin ........................ H02K 53/00 |
| 2018/0198336 A1* | 7/2018 | Abella ................... H02K 53/00 |

FOREIGN PATENT DOCUMENTS

| | | |
|---|---|---|
| GB | 2 397 698 A | 7/2004 |
| GB | 2517963 A | 3/2015 |
| WO | WO 2008/019054 A2 | 2/2008 |

OTHER PUBLICATIONS

French Preliminary Search Report dated Apr. 26, 2018 in French Application 17 56233 filed on Jun. 30, 2017.

\* cited by examiner

ELECTROMAGNETIC ENERGY CONVERTER

TECHNICAL FIELD

The present invention relates to an electromagnetic energy converter and/or an electromagnetic micro-generator. In particular, the present invention relates to an electromagnetic converter intended to be implemented in a self-contained switch.

PRIOR ART

An electromagnetic energy converter and/or an electromagnetic micro-generator (hereinafter referred to as "device"), known from the state of the art, comprises:
- a ferromagnetic yoke;
- a conductive coil formed by the winding of a conductive wire about a section of the ferromagnetic yoke;
- a main magnet, offset from the coil, forming with the yoke a closed magnetic circuit.

According to this configuration, the magnetic flux generated by the main magnet is guided through the conductive coil by the ferromagnetic yoke.

The general operating principle of the device is based on the activation of a time variation of the magnetic flux passing through the conductive coil so as to induce an electrical voltage at the terminals of the latter.

In this regard, the device is also equipped with a mechanical activation system the action of which makes it possible to activate the time variation of the magnetic flux. In particular, the time variation of the magnetic flux can be induced by a displacement of the main magnet or the conductive coil, as described in documents [1] and [2] cited in the end of the description.

However, devices described in documents [1] and [2] are not satisfactory.

Indeed, the magnetic flux passing through the conductive coil is limited by the magnetic losses (in other words the fraction of the magnetic flux produced by the magnet that does not pass through the coil) and the magnetic saturation of the ferromagnetic yoke, consequently restricting the magnetic flux variation useful in the generation of the electrical voltage at the terminals of the conductive coil.

In addition, the mechanical activation system requires the use of an energy release and/or storage module, such as spring blades or ratchets, allowing rapid movement of the conductive coil or of the main magnet so that a significant voltage can be reached at the terminals of the conductive coil. In this regard, it is recalled that according to Lenz's law, the voltage at the terminals of the conductive coil is proportional to the time derivative of the magnetic flux passing through said coil.

For example, a duration movement on the order of one millisecond is necessary for a device, having a volume on the order of 1 cm³, to generate an electrical voltage on the order of one Volt at the terminals of the conductive coil. This is particularly the case of the electromagnetic energy converters implemented in self-contained switches.

However, the energy release and/or storage module generally comes into contact (shocks, friction), for each use, with the magnetic circuit thus generating reliability and wear problems.

An object of the present invention is to propose an electromagnetic energy converter and/or a compact electromagnetic micro-generator, likely to have a significant electrical voltage at the terminals of the conductive coil.

Another object of the present invention is to propose an electromagnetic energy converter and/or an electromagnetic micro-generator the triggering control of which does not come into contact, for example into mechanical contact, with the magnetic circuit.

Another object of the present invention is to propose an electromagnetic energy converter which is simpler to implement.

STATEMENT OF THE INVENTION

The objects set out above are at least partly achieved by an electromagnetic device comprising:
- a conductive coil comprising a first and a second ends, and extending along a main axis XX',
- a main magnet held by holding means in an internal volume V formed by the conductive coil, the holding means allowing rotational movement of said main magnet about an axis YY', perpendicular to the main axis XX', between two positions of stable equilibrium called, respectively, first position of equilibrium and second position of equilibrium,
- a first and a second actuator magnets disposed, respectively, facing the first end and the second end, each having a magnetic polarity in a plane perpendicular to the axis YY', the first and second actuator magnets being arranged to be driven in translation simultaneously in the same way and parallel to the main axis XX' once a force is exerted on either of the first and second magnets, the translation of the first and second magnets according to either of the ways defined by the direction of the main axis XX' being adapted to force the main magnet to adopt, respectively, the first position of equilibrium or the second position of equilibrium.

"being driven in translation" also means "slide".

"the translation" also means "the sliding".

According to one implemented embodiment, the magnetic polarity of the first magnet forms with the main axis XX' an angle alpha, and the magnetic polarity of the second magnet forms with the main axis XX' either an angle–alpha or 180°+alpha or 180°–alpha.

According to one implemented embodiment, the device comprises a return means acting on one of the first magnet and second magnet so that the main magnet is forced to adopt one of the two positions of stable equilibrium when no external force is exerted on the first magnet and second magnet, the return means advantageously comprising a spring.

According to one implemented embodiment, the sliding of either of the first magnet and second magnet towards the main magnet is limited, respectively, by a first and a second stops, the first and second stops being arranged to prevent any contact between the main magnet and, respectively, the first magnet and the second magnet.

According to one implemented embodiment, the first magnet, the second magnet, and the main magnet are aligned along the main axis XX'.

According to one implemented embodiment, the main magnet has a symmetry of revolution about the axis YY'.

According to one implemented embodiment, the device further comprises a first ferromagnetic yoke and a second ferromagnetic yoke disposed symmetrically to each other with respect to a plane comprising the axis YY' and the main axis XX'.

According to one implemented embodiment, the first yoke and the second yoke comprise each two ends arranged to form a housing inside which the main magnet is held, the housing having a shape complementary to the main magnet.

According to one implemented embodiment, the first magnet and the second magnet are disposed in a slide.

According to one implemented embodiment, a spacing is provided between the first and the second yokes, said spacing being arranged to guide the first and the second magnets during their sliding.

According to one implemented embodiment, the device comprises two stabilizing magnets called, respectively, third magnet and fourth magnet, stationary and intended to stabilize, in one of the two positions of stable equilibrium, the main magnet once the device is idle, the stabilizing magnets being arranged in such a manner that the poles of the stabilizing magnet stabilizing the main magnet according to any of the two positions of equilibrium are aligned with those of the main magnet.

According to one implemented embodiment, the third and fourth magnets are disposed facing, respectively, the first and the second ends, and each stabilizing magnet is offset, in a different direction, from the main axis XX', the main magnet is further mounted on a carrier comprising a slide, the slide is arranged so that the rotational movement of the main magnet about the axis YY' between the two positions of equilibrium is accompanied by a translational movement, allowing alignment of the poles of the main magnet with the third magnet and the fourth magnet when said main magnet is respectively in the first position of equilibrium or in the second position of equilibrium.

According to one implemented embodiment, the magnetic polarities of each of the third and fourth magnets are parallel to the main axis XX' and are opposing each other.

According to one implemented embodiment, the third and fourth magnets are opposite, respectively, the second magnet and the first magnet.

According to one implemented embodiment, the main magnet further comprises a wedge disposed on one of its poles, and intended to be interposed between the main magnet and the third or fourth magnets when the main magnet is, respectively, in the first position of equilibrium or in the second position of equilibrium.

According to one implemented embodiment, the device further comprises a ferromagnetic yoke which comprises between two yoke ends interposed between the wedge of the main magnet and the third or fourth magnet when the main magnet is, respectively, in the first position of equilibrium or in the second position of equilibrium.

According to one implemented embodiment, the device comprises either an electromagnetic energy converter or an electromagnetic micro-generator.

The invention also relates to a switch comprising an electromagnetic device according to the present invention.

BRIEF DESCRIPTION OF THE DRAWINGS

Other characteristics and advantages will become apparent in the following description of the electromagnetic device according to the invention, given by way of non-limiting examples, with reference to the appended drawings in which.

DETAILED PRESENTATION OF PARTICULAR EMBODIMENTS

The invention described in detail below implements an electromagnetic energy converter and/or an electromagnetic micro-generator 10 (hereinafter referred to as "electromagnetic device") comprising a conductive coil 20 accommodating in its internal volume V a main magnet 30. In particular, the main magnet 30 is likely to execute a rotational movement, under the action of actuator magnets, in order to generate a time variation of the magnetic flux in the conductive coil 20, and thus to reveal an electrical voltage at the terminals of said coil.

Throughout the description, it will be considered that the alignment of the poles of two magnets means that the magnetic polarizations of these two magnets are aligned along the same axis and in the same way. In particular, once the poles of two magnets are aligned, an attractive magnetic force is exerted between these two magnets.

Figure 1:
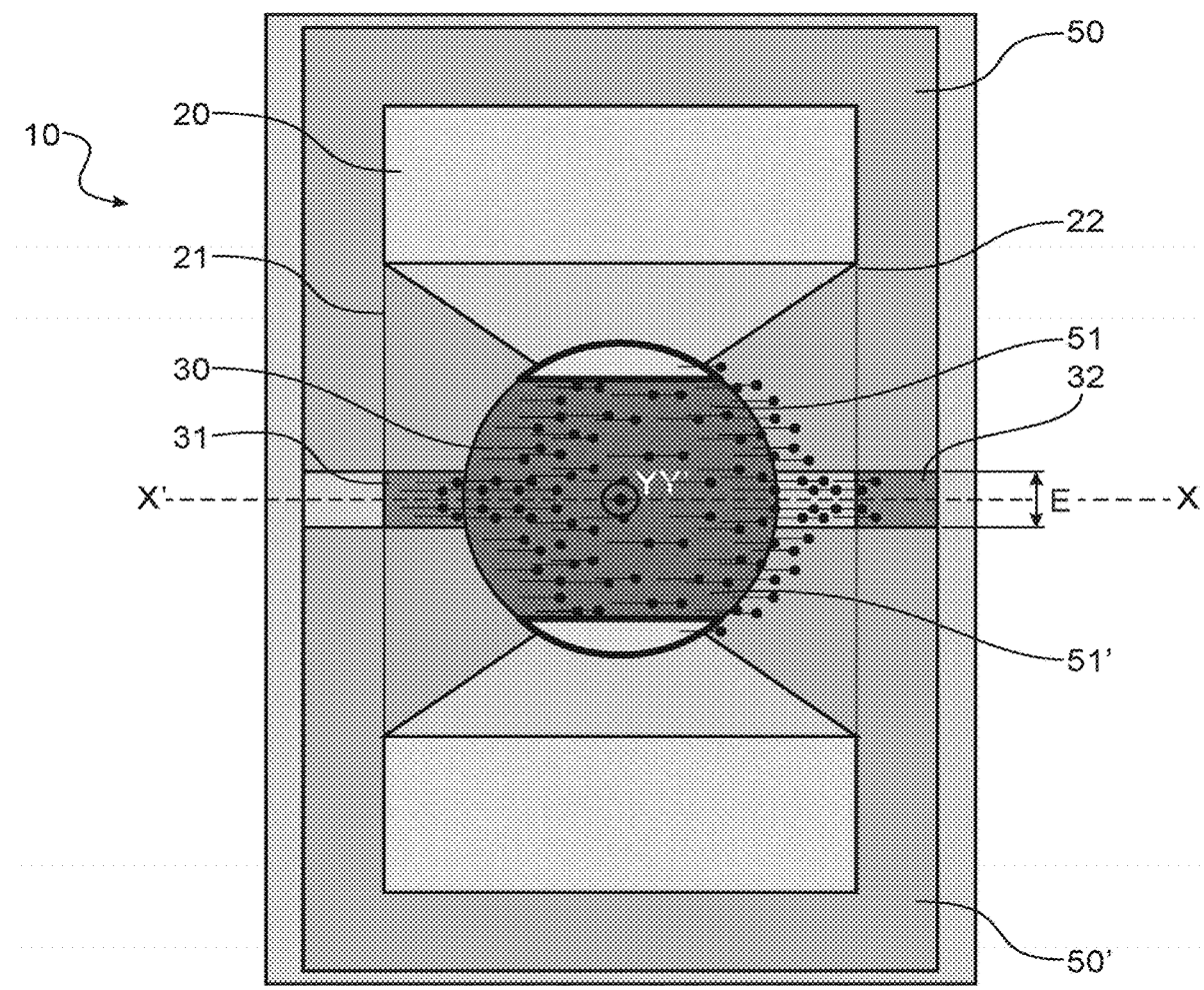
FIG. 1 is a schematic representation along a sectional plane comprising the main axis XX', and perpendicular to the axis YY', of an electromagnetic device according to a first variant of a first embodiment of the present invention.
Figure 2A:
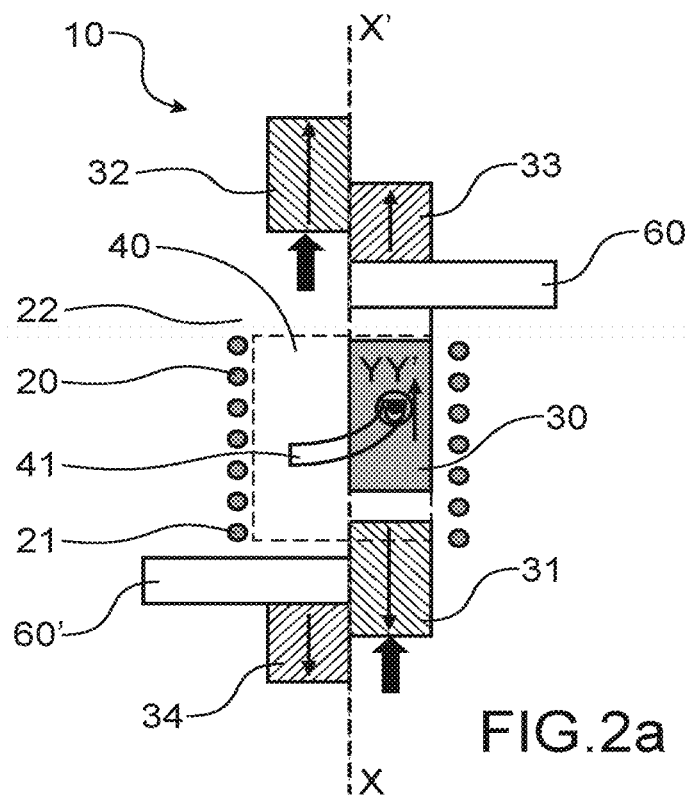
FIGS. 2a and 2b are schematic representations along a sectional plane comprising the main axis XX', and perpendicular to the axis YY', of the electromagnetic device according to a second embodiment of the present invention, in FIG. 2a the main magnet is in a first position of equilibrium, and in FIG. 2b, the main magnet is in a second position of equilibrium.
Figure 2B:
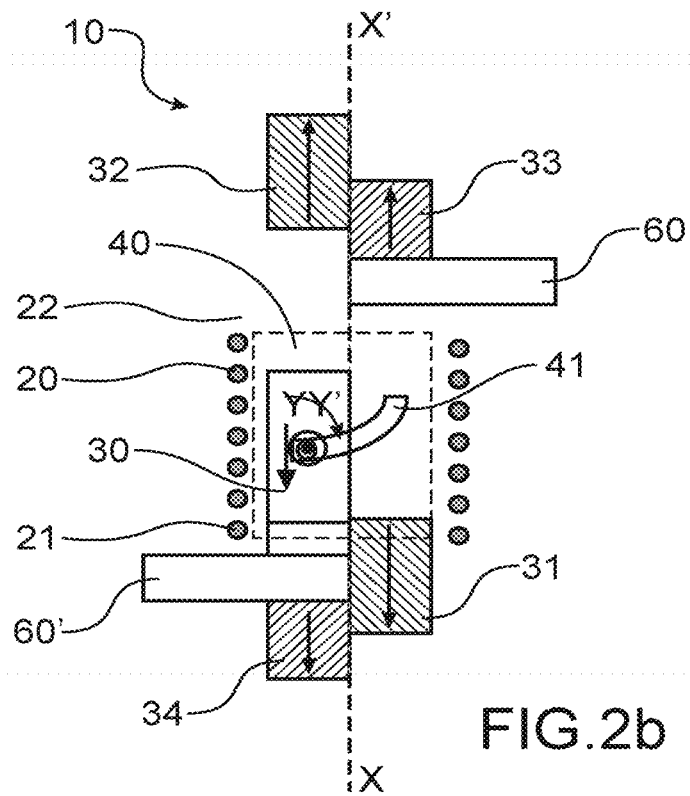

In general, the electromagnetic device 10, and as illustrated in FIGS. 1 and 2a-2b, comprises a conductive coil 20 which extends along a main axis XX' and comprises two ends called, respectively, first end 21 and second end 22.

By main axis XX' is meant an axis of symmetry of the conductive coil 20.

The conductive coil 20 is formed by a winding of a conductive wire, for example a copper wire, along a main axis XX'. The conductive coil 20 further comprises an internal volume V open at both ends of said coil. It is obvious, without needing to specify it, that the copper wire comprises two ends which are, throughout the remainder of the present description, called terminals of the conductive coil 20.

The electromagnetic device 10 also comprises a main magnet 30 disposed in the internal volume V of the conductive coil 20.

In particular, the main magnet 30 is held by holding means 40 (FIGS. 2a and 2b, 3a and 3b) in the internal volume V of the coil.

The holding means 40 allow the main magnet 30 to rotate along an axis YY', perpendicular to the main axis XX', between two positions of stable equilibrium called, respectively, first position of equilibrium and second position of equilibrium, under the action of the movement of actuator magnets called, respectively, first magnet 31 and second magnet 32.

The first magnet 31 and the second magnet 32 are disposed facing, respectively, the first end 21 and the second end 22 of the conductive coil 20.

The first magnet 31 and the second magnet 32 may have an elongate shape, for example a parallelepiped shape, and their magnetic polarity may be oriented according to their largest dimension. In other words, in the case of parallelepiped-shaped magnets, the polarity may be oriented according to the length of said magnet.

In addition, by parallelepiped shape is also meant a magnet having a generally parallelepiped shape, and the smallest side of which has a concave shape. By small side of a rectangular magnet is meant the side of smaller dimensions (smaller surface).

The first magnet 31 and the second magnet 32 may be identical. By identical is meant same shape and same magnetic polarity.

The magnetic polarity, in the present application, also refers to the orientation of the poles of a magnet. In particular, the magnetic polarity connects, within the magnet, the south pole to the north pole of said magnet. The south pole refers conventionally to a surface section of the magnet at which the magnetic flux enters. Conversely, the north pole corresponds to another surface section of the magnet from which the magnetic flux exits.

Furthermore, the first magnet 31 and the second magnet 32 are arranged so that the magnetic polarity of each of these two magnets is in a plane perpendicular to the axis YY', for example parallel to the main axis XX'. Also, the magnetic polarities of the first magnet 31 and second magnet 32 may be opposing each other. In other words, the magnetic polarity of the first magnet 31 is oriented in a way opposite to that of the second magnet 32. It is understood that the magnetic polarizations of the first magnet 31 and second magnet are not necessarily along the main axis XX' (in other words, they are not necessarily collinear with the axis XX').

In addition, the first magnet 31 and the second magnet 32 are arranged to slide simultaneously in the same way and parallel to the main axis XX' once a force is exerted on either of the first and second magnets 32.

The arrangement allowing the sliding of the first magnet 31 and second magnet 32 may comprise sliding means, for example, a slide. However, the invention is not limited to this only sliding device, and the person skilled in the art with his general knowledge can implement any other means or device likely to allow the sliding of the first magnet 31 and second magnet 32.

It is understood, without needing to specify it, that the sliding amplitude of each of the two magnets is the same during their sliding (by sliding amplitude is meant distance).

Such an effect can be obtained by binding for example fixedly the first magnet 31 and the second magnet 32.

The sliding of the first magnet 31 and second magnet 32 according to either of the ways defined by the direction of the main axis XX' is adapted to force the main magnet 30 to adopt, respectively, the first position of equilibrium and the second position of equilibrium.

Also, given the magnetic orientation of the first magnet 31 and second magnet 32, it is clear, without needing to specify it, that the magnetic polarization of the main magnet 30 is not parallel to the axis YY'.

Furthermore, and advantageously, the magnetic polarization of the main magnet 30 can be substantially perpendicular, preferably perpendicular, to the axis YY'.

In operation, in such an electromagnetic device 10, a rotational movement of the main magnet 30 of one of the positions of stable equilibrium towards the other of the two positions of stable equilibrium is induced by the sliding of the first magnet 31 and second magnet 32.

The rotation of the main magnet 30 from its second position of equilibrium to its first position of equilibrium is called "direct cycle".

The rotation of the main magnet 30 from its first position of equilibrium to its second position of equilibrium is called "indirect cycle".

The rotational movement of the main magnet 30 then induces a time variation of the magnetic field passing through the conductive coil 20 thus generating a non-zero electrical voltage at the terminals of the conductive coil 20.

The adoption of either of the positions of stable equilibrium by the main magnet 30 is governed by the amplitude of interaction between said main magnet 30 and the actuator magnets 31, 32.

In other words, if the first magnet 31 is closer to the main magnet 30 than the second magnet 32, said main magnet 30 will adopt the first position of equilibrium.

Conversely, if the second magnet 32 is closer to the main magnet 30 than the first magnet 31, said main magnet 30 will adopt the second position of stable equilibrium.

By way of illustration, the main magnet 30 may be, at an initial moment, in the second position of stable equilibrium. In other words, the second magnet 32 is closer to the main magnet 30 than the first magnet 31.

A force of mechanical origin for example exerted on the first magnet 31 in the direction XX' then makes it possible to initiate the sliding of the first magnet and second magnet 32, so that the first magnet 31 gets closer to the magnet main 30 and the second magnet 32 gets away from it.

Thus, during the sliding of the two actuator magnets, the magnetic interaction between the second magnet 32 and the main magnet 30 decreases, while the one between the first magnet 31 and the main magnet 30 increases, thereby increasing the magnetic instability of the main magnet 30.

A sudden rotation of the main magnet 30 about the axis YY' is then observed once the magnetic instability induced by the sliding of the two actuator magnets is no longer maintainable.

Thus, the rotation of the main magnet 30 is induced without making contact with said main magnet 30, de facto limiting wear and reliability problems. The turnover of the main magnet 30 induces a rapid reversal of the direction of the flux passing through the coil and therefore a maximum time variation of the magnetic flux. The voltage induced at the terminals of the conductive coil 20 by the magnetic flux variation passing therethrough makes it possible to generate an electric current that can flow in an electric charge connected to the terminals of said conductive coil 20. The mechanical work used to make the magnets 31 and 32 slide is thus converted into electrical energy.

Furthermore, the arrangement of the main magnet 30 in the internal volume V of the conductive coil 20 makes it possible to increase the flux portion useful in the generation of the electrical voltage at the terminals of said conductive coil 20. It is then possible to consider a main magnet 30 of smaller dimensions.

In addition, a main magnet 30 housed in the internal volume V of the conductive coil 20 makes the electromagnetic device 10 more compact.

The electromagnetic device 10 may also comprise a return means acting on one of the actuator magnets arranged so that the main magnet 30 is forced to adopt one of the two positions of stable equilibrium when no external force is exerted on the first magnet 31 and second magnet 32.

For example, the return means may be arranged so as to make the second magnet 32 force the main magnet to adopt the second position of stable equilibrium when no external force is exerted on the electromagnetic device 10 (and in particular on the actuator magnets). In other words, the return means can be arranged to force the second magnet 32 to be closer to the main magnet 30 than the first magnet 31. According to this configuration, when it is idle, the main magnet 30 is in the second position of equilibrium.

Still according to this configuration, if the electromagnetic device 10 has been triggered, and if the main magnet 30 has been forced to adopt the first position of equilibrium, it is understood that the return means is arranged to restore the main magnet 30 in its second position of equilibrium. By arranged to restore the main magnet 30 in its second position of equilibrium, is also meant that the return force of the return means is at least sufficient to make the main magnet 30 execute an indirect cycle without recourse to an external action.

The return means is particularly advantageous insofar as, after releasing the force exerted on the first magnet 31 to trigger a direct cycle of the main magnet 30, the return means exerts in turn a force intended to re-establish the main magnet 30 in its second position of equilibrium.

In other words, a direct cycle and an indirect cycle of the magnet main 30 can be triggered by a single action exerted on the first magnet 31, thereby making it possible to double the time variation of the magnetic flux in the conductive coil 20.

The return means may advantageously comprise a spring.

Particularly advantageously, the sliding of either of the first magnet 31 and second magnet 32 towards the main magnet 30 is limited, respectively, by a first or a second stop. The first and second stops are arranged to prevent any contact between the main magnet 30 and, respectively, the first magnet 31 and the second magnet 32.

Figure 3A:
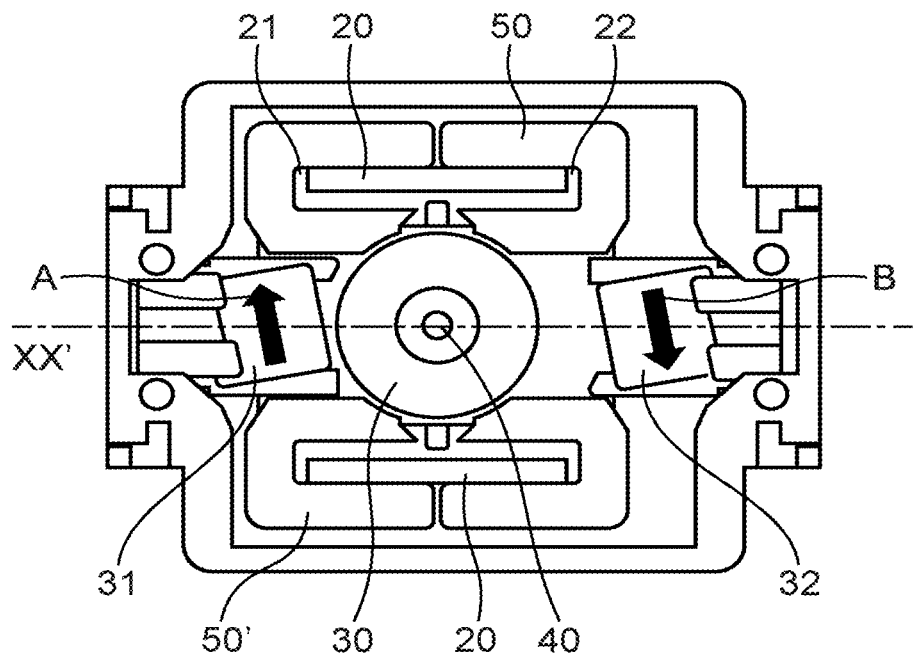
FIGS. 3a and 3b are schematic representations along a sectional plane comprising the main axis XX', and perpendicular to the axis YY', of an electromagnetic device according to two other variants of the first embodiment of the present invention.
Figure 3B:
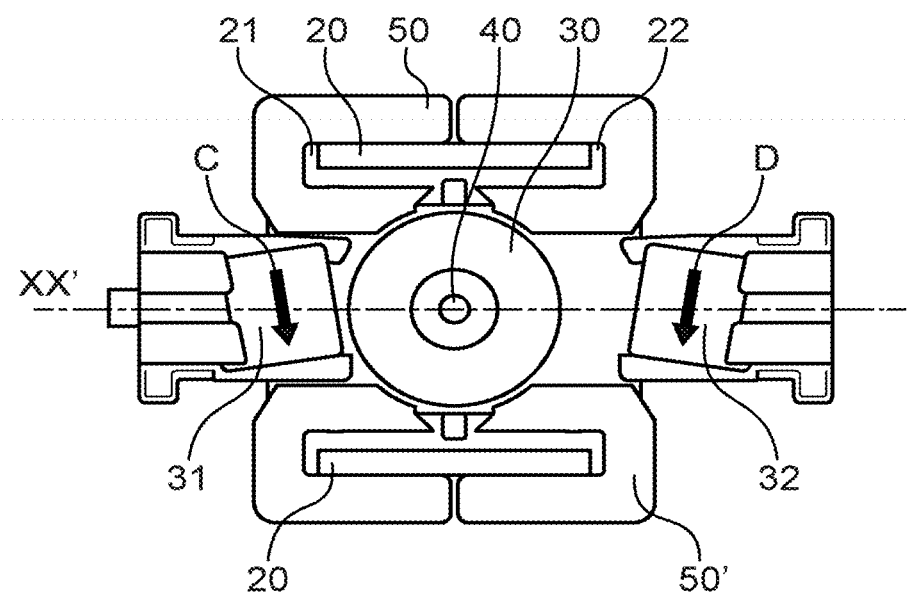

FIGS. 1, 3a and 3b illustrate a first particular embodiment of the electromagnetic energy converter 10 according to the present invention.

According to a first variant of this first embodiment (illustrated in FIG. 1), the first magnet 31, the second magnet 32 and the main magnet 30 are aligned along the main axis XX'.

By aligned along the main axis XX' is meant that the magnetic polarizations of these three magnets are collinear with the main axis XX'.

This arrangement is particularly advantageous insofar as the actuator magnet, which imposes one of the two positions of stable equilibriums on the main magnet 30, also stabilizes said magnet in this position of equilibrium (by stabilize in a position of equilibrium, is meant in particular retain).

This stabilizing effect results, essentially, from the mutual attraction between the main magnet 30 and the actuator magnet which forces it to adopt one of the two positions of stable equilibrium.

The retaining effect of the main magnet 30 by one of the actuator magnets in a position of stable equilibrium also constitutes a release means allowing the main magnet 30, when the converter is triggered, to rotate even more brutally.

It is however notable that the stabilizing effect induced by the first magnet 31 and second magnet 32 can also be obtained for other orientations of said magnets.

Thus, FIGS. 3a to 3b illustrate other variants of this first embodiment.

In particular, the magnetic polarities of the first magnet 31 and second magnet 32 (represented by the arrows A and B in FIG. 3a) have a non-zero angular deviation with respect to the main axis XX'. The magnetic polarizations of the two magnets form, for example, an angle of 180°.

Furthermore, according to this variant, the magnetic polarizations are advantageously opposing each other.

In another variant, illustrated in FIG. 3b, the magnetic polarizations of the first magnet 31 and second magnet 32 (represented by the arrows C and D in FIG. 3b) have a non-zero angular deviation with respect to the main axis XX' and form therebetween an angle of less than 180°.

The actions of the first magnet 31 and second magnet 32 according to their positions relative to the main magnet 30 are identical to those described in the first variant of this first embodiment.

In a particularly advantageous manner, the main magnet 30 may have a symmetry of revolution about the axis YY'. In other words, the main magnet 30 may be a cylinder of revolution of axis YY'. According to this configuration, the axis YY' is stationary, and may advantageously intersect the main axis XX' in the center of the conductive coil 20.

The holding means 40 of the main magnet 30 may comprise, for example, a magnet carrier. The main magnet 30 may be equipped with a lug, positioned along the axis YY', of said magnet. The magnet carrier may comprise a cavity having a shape complementary to the lug, and in which said lug is inserted.

The electromagnetic device 10 may further comprise a first ferromagnetic yoke 50 and a second ferromagnetic yoke 50' disposed symmetrically to each other with respect to a plane comprising the axis YY' and the main axis XX'.

Each of the two ferromagnetic yokes may comprise at least one ferromagnetic material selected from: iron-based alloys with high saturation induction (for example a saturation induction greater than 1.5 Tesla) such as pure iron, Si-alloyed iron (FeSi), Ni-alloyed iron (FeNi), Co-alloyed iron (FeCo). These alloys may also comprise addition elements such as Cr, P, Cu, Al.

The ferromagnetic material may also comprise at least one of the elements selected from: a spinel structure ferrite (such as MnZn, NiZn). The latter, due to its low electrical conductivity, is particularly advantageous because it allows reducing the eddy current losses.

Finally, the ferromagnetic material may also comprise at least one of the elements selected from: an Fe-based alloy of metallic glass type produced in amorphous or nanocrystalline form.

The first 50 and second 50' yokes may each comprise two ends arranged to form a housing inside which the main magnet 30 is held. It is then clear, without needing to specify it, that each of the two yokes closes on the main magnet 30. Otherwise, the two ends of a yoke have a spacing inside which the permanent magnet is located so as each of the two yokes forms with the magnet a closed magnetic loop.

Particularly advantageously, the housing (or a cavity) has a shape complementary to the main magnet 30.

The ferromagnetic yokes can be disposed around the main magnet with a width clearance perfectly determined so as to make air-gaps 51, 51' disposed opposite each other. The width of the air-gap which is formed by the air space located between the outer surface of the main magnet 30 and either of the ends of the ferromagnetic yoke determines the intensity of the magnetic flux flowing in said yoke. The magnitude that determines the influence of the air-gap on the magnetic flux is known as the reluctance. To a given air-gap width corresponds an accurate reluctance value.

The main magnet 30 may have a smooth or, in another variant, structured cylindrical outer surface. In this second case, the average surface of the magnet remains cylindrical but locally its profile deviates from the average surface according to a determined pattern. It is understood that the deviations to the average profile are greater than the roughness of the material and are typically greater than one-tenth of the value of the air-gap.

In this manner, the air space formed between the magnet and the yoke and therefore the dimensions of the air-gap will be variable depending on the angular position of the magnet. A variable air-gap creates an effect called variable reluctance effect and can thus advantageously contribute to the speed of rotation of the magnet and to its stabilization.

It is furthermore understood, without needing to specify it, that the housing formed by the ends of the ferromagnetic yokes is disposed in the internal volume V of the conductive coil 20. In particular, as represented in FIG. 1, the conductive coil forming the conductive wire 20 surrounds a first section of each ferromagnetic yoke. The first section of each ferromagnetic yoke is, as represented in FIG. 1, composed of two arms separated by the air-gap.

Each yoke forms with the main magnet 30 a closed magnetic circuit. In other words, each of the ferromagnetic yokes allows guiding the magnetic flux according to a closed circuit, and thus limiting magnetic leakages.

Particularly advantageously, the first ferromagnetic yoke 50 and the second ferromagnetic yoke 50' are spaced apart by a spacing E. Said spacing E is arranged to guide the first and second magnets 32 upon their sliding.

The electromagnetic energy converter 10 in operation allows the main magnet 30 to rotate by 180°. The addition of a return means, as described in the general description of the present invention, also allows the main magnet 30 to execute a direct cycle and an indirect cycle, each corresponding to a 180° rotation of said main magnet 30 about the axis YY'.

FIGS. 2a and 2b illustrate a second particular embodiment of the electromagnetic energy converter 10 according to the present invention.

According to this second embodiment, the converter comprises two stationary stabilizing magnets called, respectively, third magnet 33 and fourth magnet 34. The two stabilizing magnets are intended to stabilize in one of the two positions of equilibrium the main magnet 30 once the converter is idle.

The retaining effect of the main magnet 30 by one of the stabilizing magnets in a position of stable equilibrium also constitutes a release means allowing, when the converter is triggered, the main magnet 30 to rotate even more brutally.

In addition, the stabilizing magnets are arranged in such a manner that the poles of the stabilizing magnet stabilizing the main magnet 30 in one of the two positions of equilibrium are aligned with those of the main magnet 30.

Advantageously, the third magnet 33 and the fourth magnet 34 are arranged facing, respectively, the first end 21 and the second end 22. Moreover, each stabilizing magnet is offset, in a different direction, from the main axis XX'. By offset, in a different direction, from the main axis XX', is meant disposed on either side of said axis.

In addition, according to this arrangement, the main magnet 30 is mounted on a carrier (otherwise the holding means 40) comprising a slide 41, the slide being arranged so that the rotational movement of the main magnet 30 about the axis YY' between the two positions of equilibrium is accompanied by a translational movement, allowing alignment of the poles of the main magnet 30 with the third magnet 33 and fourth magnet 34 when said main magnet 30 is located respectively in the first position of equilibrium or in the second position of equilibrium.

The slide 41 may be rectilinear, or curved.

The main magnet 30 can be guided in the slide by the lug disposed on said magnet.

The main magnet 30 may have an elongated shape, for example a parallelepiped shape.

The magnetic polarities of each of the third magnet 33 and fourth magnet 34 may be parallel to the main axis XX' and may be opposing each other.

In addition, as represented in FIGS. 2a and 2b, the third magnet 33 and the fourth magnet 34 can be opposite, respectively, the second magnet 32 and the first magnet 31.

Advantageously, the main magnet 30 may comprise a wedge disposed on one of its ends, and intended to be interposed between the main magnet 30 and the third magnet 33 or the fourth magnet 34 when the main magnet 30 is respectively in the first position of equilibrium or second position of equilibrium. This wedge can thus absorb the shocks experienced by the main magnet 30 during its stabilization.

The wedge may comprise at least ferromagnetic materials selected from: an iron-based alloy with a high saturation induction such as pure iron, Si-alloyed iron (FeSi), Ni-alloyed iron (FeNi), Co-alloyed iron (FeCo).

These alloys may also contain addition elements such as Cr, P, Cu, Al.

The ferromagnetic material may also comprise at least one of the elements selected from: a spinel structure ferrite (MnZn, NiZn). The latter, due to its low conductivity, is particularly advantageous because it allows reducing the eddy current losses.

Finally, the ferromagnetic material may also comprise at least one of the elements selected from: a Fe-based alloy of metallic glass type produced in amorphous or nanocrystalline form.

Advantageously, the converter further comprises a ferromagnetic yoke which comprises two yoke ends 60 and 60' interposed between the wedge of the main magnet 30 and third magnet 33 or the fourth magnet 34 when the main magnet 30 is respectively in the first position of equilibrium or second position of equilibrium.

The ferromagnetic yoke allows guiding the magnetic flux produced by the main magnet 30 through the conductive coil 20 and thus limiting magnetic leakages.

The triggering of the converter can be initiated by exerting a force on the first magnet 31 for example (if the main magnet 30 is in the second position of equilibrium). The sliding of the first magnet 31, and therefore of the second magnet 32, is initially prevented by the main magnet 30 whose poles have an orientation opposite to that of the poles of the first magnet 31. During this phase, the fourth magnet 34 (stabilizer), holds the main magnet 30 in the second position of equilibrium, and there is a storage of energy in the system as the force exerted on the first magnet 31 increases. As soon as the distance between the first magnet 31 and the main magnet 30 decreases, this energy increases further, until the main magnet 30 cannot be held in the second position because of the magnetic instability induced by the approximation of the first magnet 31.

A sudden 180° turnover of the main magnet 30 is then produced, accompanied by a displacement of said magnet along the slide of the carrier.

The main magnet 30, following this movement, is in its second position of equilibrium, with its poles being aligned with those of the fourth magnet 34.

The abrupt turnover of the main magnet 30 generates a magnetic flux variation through the conductive coil 20, thus revealing an electrical voltage at the terminals of said conductive coil 20.

If the electromagnetic energy converter 10 is provided with the return means (for example a spring acting on the second magnet 32), the main magnet 30 is restored to its second position of equilibrium once the force exerted on the first magnet 31 is released. The return means thus makes it possible to double the time variation of the magnetic flux.

The opposite effect can be obtained from the first position of equilibrium and by exerting a force on the second magnet 32.

By way of example, the main magnet 30 may have a remanence B of 0.5 Tesla, and occupy half of the internal volume V of the conductive coil 20. The conductive coil 20 may have a cross section of S=0.1 cm², and comprise N=10 turns. According to this arrangement, an electrical voltage of 2*N*B*S/Δt=10 Volt can be generated. If it is considered that the resistance of the electric wire forming the conductive coil 20 is of R=1Ω (Ohm), then the energy produced is E=e²/RΔt=1000 μJ.

The main magnet 30 and the actuator magnets may be sintered magnets or plasto-magnets. The plasto-magnets obtained by molding have the advantage of being able to be manufactured at low costs according to complex shapes and magnetization distributions. Such magnets have the following interesting characteristics for electromagnetic microgenerators and/or electromagnetic energy converters:

They can comply with the volumes available in the device,

The shape and/or the profile of their outer surface can be optimized to create a variable air-gap during the movement of the magnet and therefore a variable reluctance effect that improves the performances of the converter, The distribution of the magnetization, that is to say the direction connecting the poles of the magnet, can be optimized to improve the flow of the flux in the magnetic circuit and limit the flux losses, The plasto-magnets are less sensitive to shocks and ageing problems such as corrosion, The plasto-magnets can be obtained by molding, in particular by the plastic injection technique. For this purpose, a mixture of polymers (for example thermosetting polymer such as PA) and magnetic powder (for example SmCo) is heated and injected in fluid form into the cavity of a mold. During the injection, a magnetic field is applied on the recess so as to orient and magnetize the magnetic powders. The part cools in this configuration until solidification and thus preserves its magnetic polarization. It is possible to manufacture complex-shaped multi-polar magnets. Additional functions can be added to the magnet to facilitate its integration into a mechanical system (for example the addition of lugs, . . . ).

The present invention also relates to a wireless and/or battery-free self-contained switch intended to provide control of home automation functions such as the lighting, opening and closing of roller shutters.

REFERENCES

[1] U.S. Pat. No. 9,240,267,
[2] U.S. Pat. No. 9,509,304.

The invention claimed is:

1. An electromagnetic device comprising:
a conductive coil comprising first and second ends, and extending along a main axis XX',
a main magnet held by holding means in an internal volume V formed by the conductive coil, the holding means allowing rotational movement of said main magnet about an axis YY', perpendicular to the main axis XX', between two positions of stable equilibrium called, respectively, a first position of equilibrium and a second position of equilibrium, and
first and second actuator magnets disposed, respectively, facing the first end and the second end, each having a magnetic polarity in a plane perpendicular to the axis YY', the first and second actuator magnets being arranged to be driven in translation simultaneously in the same way and parallel to the main axis XX' once a force is exerted on either of the first and second magnets, the sliding of the first and second magnets according to either of the ways defined by the direction of the main axis XX' being adapted to force the main magnet to adopt, respectively, the first position of equilibrium or the second position of equilibrium.

2. The device according to claim 1, wherein the magnetic polarity of the first magnet forms with the main axis XX' an angle alpha, and the magnetic polarity of the second magnet forms with the main axis XX' either an angle −alpha, or 180°+alpha, or 180° −alpha.

3. The device according to claim 1, wherein the device comprises a return means acting on one of the first and second magnets so that the main magnet is forced to adopt one of the two positions of stable equilibrium when no external force is exerted on the first and second magnets.

4. The device according to claim 3 wherein, the return means comprises a spring.

5. The device according to claim 1, wherein the sliding of either of the first and second magnets towards the main magnet is limited, respectively, by a first and a second stops, the first and second stops being arranged to prevent any contact between the main magnet and, respectively, the first and second magnets.

6. The device according to claim 1, wherein the first magnet, the second magnet, and the main magnet are aligned along the main axis XX'.

7. The device according to claim 1, wherein the main magnet has a symmetry of revolution about the axis YY'.

8. The device according to claim 7, wherein the device further comprises a first ferromagnetic yoke and a second ferromagnetic yoke disposed symmetrically to each other with respect to a plane comprising the axis YY' and the main axis XX'.

9. The device according to claim 8, wherein the first and second yokes comprise each two ends arranged to form a housing inside which the main magnet is held, the housing having a shape complementary to the main magnet.

10. The device according to claim 7, wherein the first and second magnets are disposed in a slide.

11. The device according to claim 8, wherein a spacing is arranged between the first and the second yokes, said spacing being arranged to guide the first and the second magnets during their sliding.

12. The device according to claim 1, wherein the device comprises two stabilizing magnets called, respectively, third magnet and fourth magnet, stationary and intended to stabilize, in one of the two main positions of equilibrium, the main magnet once the device is idle, the stabilizing magnets being arranged in such a manner that the poles of the stabilizing magnet stabilizing the main magnet according to the any of the two positions of stable equilibrium are aligned with those of the main magnet.

13. The device according to claim 12, wherein the third magnet and the fourth magnet are disposed facing, respectively, the first and the second ends, and each stabilizing magnet is offset, in a different direction, from the main axis XX', the main magnet is further mounted on a carrier comprising a slide, the slide is arranged so that the rotational movement of the main magnet about the axis YY' between the two positions of equilibrium is accompanied by a translational movement, allowing alignment of the poles of the main magnet with the third magnet and the fourth magnet when said main magnet is respectively in the first position of equilibrium or in the second position of equilibrium.

14. The device according to claim 13, wherein the magnetic polarities of each of the third magnet and fourth magnet are parallel to the main axis XX' and are opposing each other.

15. The device according to claim 12, wherein the third magnet and the fourth magnet are opposite, respectively, the second magnet, and the first magnet.

16. The device according to claim 12, wherein the main magnet further comprises a wedge disposed on one of its poles, and configured to be interposed between the main magnet and the third magnet or the fourth magnet when the main magnet is, respectively, in the first position of equilibrium or in the second position of equilibrium.

17. The device according to claim 16, wherein the device further comprises a ferromagnetic yoke which comprises two yoke ends, forming an air-gap, and interposed between the wedge of the main magnet and the third magnet or the fourth magnet when the main magnet is, respectively, in the first position of equilibrium or in the second position of equilibrium.

18. The device according to claim 1, wherein the device is either an electromagnetic energy converter or an electromagnetic micro-generator.

19. A switch comprising the device according to claim 1.

* * * * *